United States Patent [19]

Savit

[11] Patent Number: 4,577,723
[45] Date of Patent: Mar. 25, 1986

[54] METHOD FOR IMPROVING THE EFFICIENCY OF AIR GUNS

[75] Inventor: Carl H. Savit, Houston, Tex.

[73] Assignee: Western Geophysical Company of America, Houston, Tex.

[21] Appl. No.: 289,564

[22] Filed: Aug. 3, 1981

[51] Int. Cl.⁴ .............................................. G01V 1/02
[52] U.S. Cl. ................................... 181/120; 181/113; 181/119; 367/144
[58] Field of Search ............................ 131/110–113, 131/115, 118, 119, 120; 367/24, 140–145, 15; 114/20 R, 67 A, 67 R

[56] References Cited

U.S. PATENT DOCUMENTS

| 3,230,919 | 1/1966 | Crawford | 114/67 R |
| 3,246,286 | 4/1966 | Barry | 181/118 |
| 3,286,674 | 11/1966 | Thompson et al. | 114/20 |
| 3,435,796 | 4/1969 | Merrill | 114/67 R |
| 3,474,867 | 10/1969 | Leibach | 166/315 |
| 3,746,123 | 7/1973 | Huffhines | 181/115 |
| 3,895,595 | 7/1975 | Kelly et al. | 367/106 |
| 3,993,000 | 2/1970 | Canevari | 137/13 |
| 4,186,679 | 2/1980 | Fabula et al. | 114/20 R |

OTHER PUBLICATIONS

Hughes et al., "Fluid Dynamics" Schaum's Outline Series in Engineering, Chap. 12 Non-Newtonian Fluids pp. 230–232, McGraw-Hill Book Co.
Schlichting, "Boundary Layer Theory" McGraw-Hill Book Co. (1979) pp. 729–730.
"Polymer Additives Reduce Fluid Drag in Turbulent Flow" Physics Today Mar. (1978), pp. 17–19.
Ziolkowski, Anton, "A Method for Calculating the Output Pressure Waveform from an Air Gun", Geophys. J. R. astr., Soc. (1970) Jun. 18, pp. 137–161.
Sheriff, R. "Encyclopedia Dictionary of Exploration Geophysics" published by Society of Exploration Geophysicists (1973) Lib. of Congress Cat. Card No. 72-94565.
Skudrzyk et al., "Flow Noise, Theory and Experiment" Pennsylvania State University Ordnance Research Laboratory Lecture 14, Jul. 31–Aug. 11, 1961, pp. 255, 275–276.
"Polymer Additives Reduce Fluid Drag in Turbulent Flow", Physics Today, Mar. 1978, pp. 17–19.

Primary Examiner—Salvatore Cangialosi
Assistant Examiner—Ian J. Lobo
Attorney, Agent, or Firm—William A. Knox

[57] ABSTRACT

A quantity of a solution of a long-chain polymer is injected into the water around an air gun. The resulting dilute solution of the long-chain polymer tends to reduce turbulence surrounding the air bubble that is created when the gun is fired.

1 Claim, 2 Drawing Figures

METHOD FOR IMPROVING THE EFFICIENCY OF AIR GUNS

BACKGROUND OF THE INVENTION

1. Field of the Invention

This invention relates to air guns as used in marine seismic exploration and in particular to a method and apparatus for improving their efficiency.

2. Discussion of the Prior Art

Air guns are commonly-used sound sources for use in marine seismic exploration for natural resources. The purpose of an air gun is to convert the potential energy of a volume of compressed air into kinetic energy in the water as an acoustic pulse. In general, an air gun consists of a chamber for containing a volume of air compressed to a pressure of several hundred atmospheres. The chamber includes one or more exaust ports that are normally closed by fast-acting valves. Upon command, the valves are momentarily opened to impulsively release jets of compressed air. Rapid expansion of the air bubble creates the desired shock wave or acoustic pulse.

Typical air guns are described in U.S. Pat. Nos. 4,114,723 and 4,180,139 which show the mechanical structure and operation of air guns. Both patents are assigned to the assignee of this invention.

I have discovered, with the aid of slow-motion photographs, that when an air gun is fired, the released air creates turbulence and vortices in the water around the gun. The conversion of the potential energy of the compressed air to kinetic or acoustic energy is therefore inherently inefficient.

SUMMARY OF THE INVENTION

It is an object of my invention to improve the efficiency of an air gun.

In accordance with a preferred aspect of the invention, I create in a volume around the gun, a dilute solution of a selected substance that improves the efficiency of the air gun.

In accordance with another aspect of this invention, I provide a reservoir attached to an air gun for containing a solution of the selected substance. Solution-ejection ports, that communicate with the reservoir, are disposed near the exaust ports of an air gun. Just before the gun is to be fired, a quantity of the solution is released through the solution-ejection ports into the water around the air gun.

In accordance with yet another aspect of this invention, the selected substance is a long-chain polymer having a very high molecular weight.

In accordance with more specific aspects of this inventon, release of the solution is controlled by an electrically actuated solenoid valve located in the fluid line connecting the reservoir with the solution-ejection ports.

In accordance with another aspect of this invention, some of the compressed air from the air gun is bled into the reservoir through a pressure reduction valve. The reservoir containing the dilute polymer solution is pressurized to a desired pressure above the ambient water pressure around the air gun.

BRIEF DESCRIPTION OF THE DRAWINGS

A more complete understanding of this invention may be gained from the appended detailed description and the drawings wherein.

DETAILED DESCRIPTION OF A PREFERRED EMBODIMENT

Figure 1:
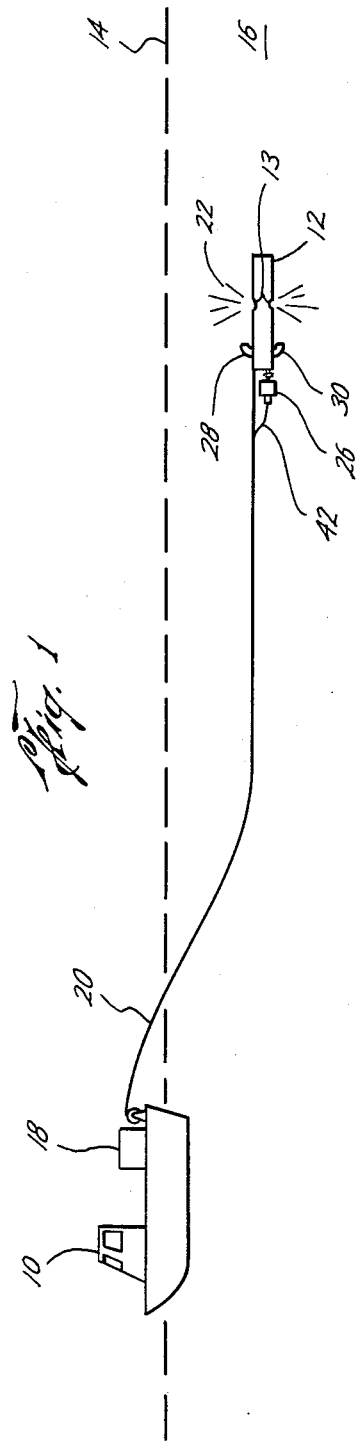
FIG. 1 shows a ship towing an air gun beneath the surface of a body of water.

Referring now to FIG. 1, there is shown a ship 10 towing an air gun 12, of any well-known commercial type, having exaust ports 13, beneath the surface 14 of a body of water 16. An air compressor 18 on board ship 10 provides air to gun 12 through a suitable hose 20. The air gun is fired periodically by an electrical signal transmitted to gun 12 over suitable conductors, not shown. Upon firing, gun 12 emits a volume of air to form an air bubble 22.

When the air is abruptly released from gun 12, it forms an expanding bubble. Vortices and severe turbulence in the bubble dissipate the available kinetic energy. A dilute solution of certain polymers injected into the water around the exaust ports will reduce or eliminate the turbulence.

It is known that dilute solutions of certain long-chain polymers are capable of reducing turbulent shear flow in water and prevent formation of eddies and vortex streets in water boundary layers. The polymer molecules strongly interact with each other when they become stretched or extended in turbulent shear flow zones. The interaction causes a large increase in viscosity in the turbulent zone without affecting the water-flow characteristics in the laminar flow zones.

Heretofore, use of polymers for turbulence reduction has been addressed to their use with objects towed through the water, such as ship hulls and torpedos, or with water jetted into the air mass as applied to a fire hose. I address the inverse application of reducing the turbulence associated with an air jet injected into a water mass in connection with air guns.

Many suitable long-chain polymers are known and are commercially available. A partial list includes:

Polyvinyl cloride
Polyethylene
Polypropylene
Polystyrene
Polyacrilamide
Polymethyl methacrylate
Polyethylene oxide
Polydimethyl siloxane Solvents for those polymers include benzene, toluene, N-butanol, isopropanol, and glycerin. The solvent depends, of course on the particular polymer employed and the environment in which it is employed. For use with this invention of course, a water miscible solvent is preferred. A preferred polymer is polyethylene oxide because it is nontoxic and biodegradable.

The dilution required is great, usually a few parts per million (ppm). A dilution range may lie between 10–200 ppm, depending upon the application. The term "dilution range" as applied to use with an air gun, relates to the dilution of the polymer in the volume of water surrounding the gun exaust ports in an amount effective to achieve the desired improvement in the efficiency of the air gun, not the actual concentration of the polymer in the reservoir.

Figure 2:
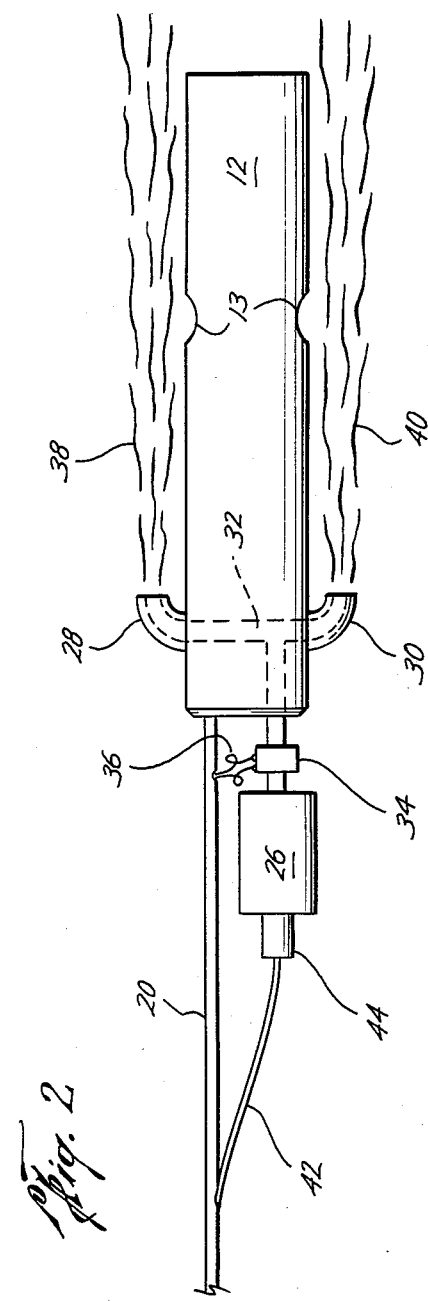
FIG. 2 illustrates the essential components of the polymer-containing reservoir attached to an air gun and the ejection ports.

In accordance with a preferred embodiment of my method, I provide an air gun 12 (FIG. 2) having exaust ports 13 and an air supply hose 20. At the leading end of the gun there is attached a reservoir 26 for containing a solution of a selected polymer. Reservoir 26 communicates with ejection ports 28 and 30 by a branching passageway 32, shown as dashed lines. An electrically-operated shutoff valve 34, actuated by signals from ship 10 through conductors 36, periodically allows ejection of a quantity of the polymer solution into the surrounding water through ports 28 and 30 as shown symbolically by groups of wavy lines 38 and 40 to form a subvolume of water containing the dissolved polymer. Reservoir 26 is pressurized to a desired pressure greater than ambient by diverting a little bit of compressed air from hose 20 through branch line 42 to a pressure reduction valve 44 of any conventional type.

In operation, immediately prior to firing the gun, a signal is sent to shutoff valve 34 from ship 10 through leads 36. The valve opens momentarily to meter a flow of the polymer solution into the surrounding water. Upon firing of the gun, the volume of compressed air in the gun is released into the water forming an air bubble. The presence of the diluted polymer in the water minimizes formation of turbulence, vortices and other undesired attributes of the air bubble thereby conserving kinetic energy, enhancing desired characteristics of the resulting acoustic wave and improving the efficiency of the air gun.

During normal operations, ship 10 is in constant motion at a desired speed. The amount of solution metered from reservoir 26 necessarily depends upon the towing speed. Release of the solution is terminated just before the gun fires.

I claim as my invention:

1. A method for generating seismic waves in a body of water comprising the steps of:

immersing an air gun, having at least one exhaust port, in said body of water;

metering a desired amount of a selected long-chain polymer into the water around the exhaust port of said air gun; and firing said air gun.

* * * * *